UNITED STATES PATENT OFFICE.

ROBERT DEMUTH, OF ELBERFELD, GERMANY, ASSIGNOR TO THE FARBENFABRIKEN OF ELBERFELD COMPANY, OF NEW YORK.

INDIGO-BLUE DYE AND PROCESS OF MAKING IT.

SPECIFICATION forming part of Letters Patent No. 614,538, dated November 22, 1898.

Application filed November 20, 1897. Serial No. 659,328. (Specimens.)

*To all whom it may concern:*

Be it known that I, ROBERT DEMUTH, doctor of philosophy and chemist, of Elberfeld, Germany, (assignor to the FARBENFABRIKEN OF ELBERFELD COMPANY, of New York,) have invented a new and useful Improvement in the Manufacture of Indigo-Blue Cotton-Dye; and I do hereby declare the following to be an exact and clear description thereof.

My invention relates to the production of a new class of indigo-blue cotton dyestuffs by subjecting 1.8 amidonaphtholsulfo acids or salts thereof to the action of an alkaline sulfid-carrying compound at elevated temperatures and subsequently treating the resulting melt in a suitable manner in order to isolate therefrom the blue dye, which isolation may be effected by repeatedly treating the melt with small quantities of hot water, filtering off the solutions thus formed, continuing this extraction until the blue dye contained in the melt has been wholly dissolved out, and finally precipitating from the resulting filtrates the blue dye with common salt, zinc chlorid, zinc ammonium chlorid, or the like. In case zinc chlorid is used the precipitates when filtered off, pressed, dried, and pulverized are blackish powders insoluble in water, in sodium-carbonate solution, and in hydrochloric acid, (21° Baumé,) for the most part soluble in soda-lye (40° Baumé) with a bluish color, in concentrated sulfuric acid (66° Baumé) with a dull bluish-red color, and in hot watery solutions of sodium sulfid with a brownish color which turns into blue on exposure to the air. The products thus obtained dye unmordanted cotton in alkaline baths indigo-blue shades which are fast against the action of alkalies and light and yield the same shades when they are dyed in hot or cold baths containing suitable reducing agents. In using hot baths alkaline sulfid or alkaline carbonate and grape-sugar may be profitably employed as reducing agents, while in the case of using cold baths alkaline sulfid is used with preference.

In order to carry out my process practically, I can proceed as follows without limiting myself to the details given: Fifty parts, by weight, of 1.8 amidonaphthol 2.4 disulfo-acid previously neutralized by means of soda-lye (40° Baumé) are mixed with eighty-one parts, by weight, of dry sodium sulfid and seventy-five parts, by weight, of flowers of sulfur. The resulting mixture is slowly heated in an iron vessel, profitably by means of a metallic bath, to 200° centigrade, (temperature of the bath,) taking care that the mass is well stirred and keeping the same at the said temperature until it has become solid and can be easily minced to form a powdery mass. At this stage the vessel is closed, the temperature of the bath is raised to 240° centigrade, and heating is continued for about four hours. After cooling the blackish powdery melt is taken out from the vessel and repeatedly treated with small quantities of hot water. The resulting solutions are poured on a filter, and this extraction of the melt is continued until the blue dye is wholly dissolved out. From the joint filtrates the blue dye is precipitated by means of a solution in water of zinc chlorid. When filtered off, pressed, dried, and powdered, it forms a blackish powder insoluble in water, sodium-carbonate solution, and hydrochloric acid of 21° Baumé, for the most part soluble in soda-lye (40° Baumé) with a bluish color, in concentrated sulfuric acid (66° Baumé) with a dull bluish-red color, and in hot watery solutions of sodium sulfid with a brownish color, turning into blue at exposure to the air. It dyes unmordanted cotton in alkaline baths indigo-blue shades which are fast against the action of alkalies and light and yields the same shades when it is dyed in boiling baths containing sodium sulfid or sodium carbonate and grape-sugar or when it is dyed in cold baths containing sodium sulfid or the like.

The process proceeds in an analogous manner if in place of sulfur and sodium sulfid used in the above example other alkaline sulfid-carrying compounds, such as sulfur and potassium sulfid, sulfur and soda, sulfur and potassa, sodium polysulfid, potassium polysulfid, or the like are employed. The same result is obtained if the 1.8 amidonaphthol 2.4 disulfo-acid used in the preceding example is replaced by other 1.8 amidonaphthol di or mono sulfo acids.

Having now described my invention and in what manner the same is to be performed, what I claim as new, and desire to secure by Letters Patent, is—

1. The process for the production of new dyes giving blue shades on unmordanted cotton in alkaline baths, or in baths containing suitable reducing agents, which process consists in subjecting sulfo-acid compounds of 1.8 amidonaphthol, such as their free acids, or salts thereof, to the action of an alkaline sulfid-carrying compound at elevated temperatures, repeatedly extracting the resulting melt when cold with small quantities of hot water, until the blue dye is wholly dissolved out and finally isolating from the joint filtrates the dye by precipitation with metallic salts, for example, zinc chlorid, substantially as described.

2. The process for the production of a new dye giving indigo-blue shades on unmordanted cotton in alkaline baths, or in baths containing suitable reducing agents which process consists in subjecting the sodium salt of 1.8 amidonaphthol 2.4 disulfo-acid to the action of sodium sulfid and flower of sulfur at elevated temperatures, repeatedly extracting the resulting melt when cold with small quantities of hot water, until the blue dye is wholly dissolved out, and finally isolating from the joint filtrates the dye by precipitation with a watery solution of zinc chlorid, substantially as described.

3. As new articles of manufacture the blue dyes obtainable from sulfo-acid compounds of 1.8 amidonaphthol, such as their free acids, their salts, by the action of alkaline sulfid-carrying compounds at elevated temperatures, forming when precipitated by means of zinc chlorid, dried and pulverized, blackish powders, insoluble in water, sodium-carbonate solution and hydrochloric acid of 21° Baumé, for the most part soluble in soda-lye of 40° Baumé with a bluish color, in concentrated sulfuric acid of 66° Baumé with a dull bluish-red color and in hot watery solutions of sodium sulfid with a brownish color, turning into blue at exposure to the air, producing on unmordanted cotton in alkaline baths and in baths containing suitable reducing agents bluish shades fast to the action of alkalies and light, substantially as described.

4. As a new article of manufacture the specific indigo-blue dye obtainable from 1.8 amidonaphthol 2.4 disulfo-acid by the action of alkaline sulfid-carrying compounds at elevated temperatures, forming when precipitated by means of zinc-chlorid, dried and pulverized, a blackish powder, insoluble in water, sodium-carbonate solution and hydrochloric acid of 21° Baumé, for the most part soluble in soda-lye of 40° Baumé with a bluish color, in concentrated sulfuric acid of 66° Baumé with a dull bluish-red color, and in hot watery solutions of sodium sulfid with a brownish color, turning into blue at exposure to the air, producing on unmordanted cotton in alkaline baths and in baths containing suitable reducing agents, indigo-blue shades fast to the action of alkalies and light, substantially as described.

In testimony whereof I have signed my name in the presence of two subscribing witnesses.

ROBERT DEMUTH.

Witnesses:
R. E. JAHN,
OTTO KÖNIG.